No. 814,737. PATENTED MAR. 13, 1906.
B. C. SEATON.
TIRE.
APPLICATION FILED MAY 26, 1905.
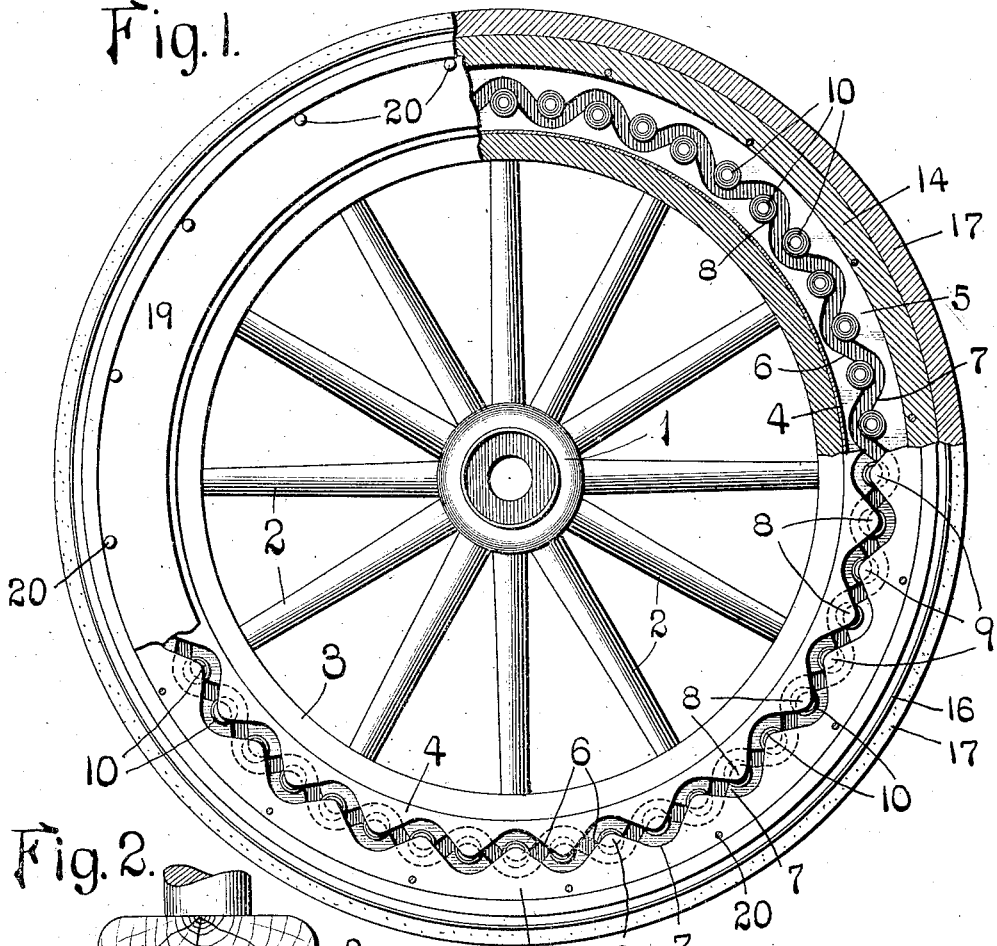
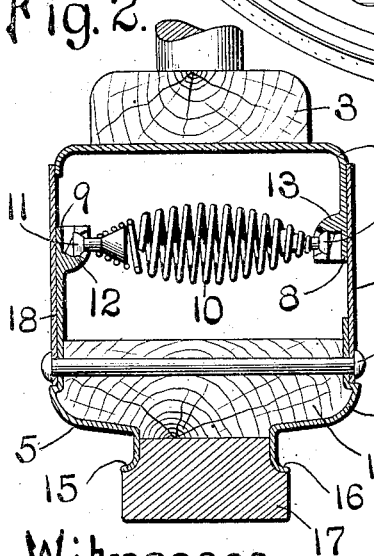
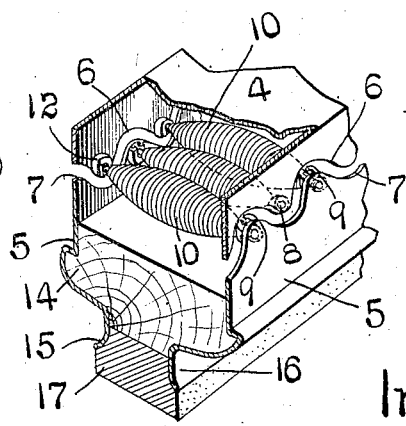
Witnesses
Inventor:
Benjamin C. Seaton

UNITED STATES PATENT OFFICE.

BENJAMIN C. SEATON, OF ST. LOUIS, MISSOURI, ASSIGNOR OF THREE-EIGHTHS TO F. A. KEHL, OF ST. LOUIS, MISSOURI.

TIRE.

No. 814,737.  Specification of Letters Patent.  Patented March 13, 1906.

Application filed May 26, 1905. Serial No. 262,409.

*To all whom it may concern:*

Be it known that I, BENJAMIN C. SEATON, a citizen of the United States, residing at the city of St. Louis, State of Missouri, have invented a certain new and useful Improvement in Tires, of which the following is a full, clear, and exact description, such as will enable others skilled in the art to which it appertains to make and use the same, reference being had to the accompanying drawings, forming part of this specification, in which—

Figure 1 is a side elevational view showing part of one of the side plates removed and part of the wheel in section to illustrate the arrangement of the springs. Fig. 2 is a sectional view through the tire and rim; and Fig. 3 is a fragmentary perspective view of the yielding portion of the wheel, part of the inner rim being broken away to show the arrangement of the springs.

This invention relates to the general class of wheels, but particularly to a resilient tire therefor which will possess the requisite amount of resiliency without the disadvantage attendant upon the use of pneumatic tires.

Another object is to provide a wheel-tire which will have all of the advantages of a pneumatic tire and which will not be liable to puncture or wear out as readily as the tire of the pneumatic type.

Another object of the invention is to provide means whereby the resiliency of the tire will be uniformly distributed around the axis of the wheel.

Other objects and advantages, as well as the minor details of construction, will be referred to hereinafter, it being understood that changes in the form, proportion, and minor details of construction may be resorted to without departing from the principle of my invention or sacrificing any of the advantages thereof.

In order to illustrate the preferred embodiment of my invention, I have shown it applied to a wheel, as shown in Fig. 1, in which 1 designates the hub, 2 the radially-disposed spokes, and 3 the felly. Secured to the felly is a tire, which tire is illustrated as comprising an inner rim 4 and an outer rim 5. These rims are provided with alining vertical walls to form an approximately-rectangular housing, and the alining walls are provided with adjacent peripheries of sinusoidal contours, designated by the numerals 6 and 7 and spaced apart to form a sinuous slot in the side wall of the housing. The sinusoidal projections designated by the numerals 8 and 9 are arranged in alternating circular series—that is, the projections carried by the upper rim alternate with those carried by the lower rim—so that the slot is of approximately the same shape as the adjacent edges of the side walls of the respective rims, which are illustrated as being parallel with each other. These projections are also arranged to alternate transversely—that is to say, the end of one projection of each of the rims is opposite the space between the bases of the projections on the opposite side wall of that particular rim—and the reason for this is to provide means for fastening the coil-springs 10, so that when weight is applied to the wheel the tension of the springs will be equally distributed circumferentially around the felly of the wheel. The springs employed are illustrated as having relatively large convolutes at their central portion, which convolutes gradually decrease toward their respective ends, and the end coils or convolutes of the spring engage headed fastening devices 11, which are adapted for engagement with recesses 12 and 13 on the lower and upper rims, respectively.

Attention is directed to the peculiar manner in which the springs are assembled. One end of each spring is secured to the upstanding sinusoidal projection of the lower rim, while the other end is secured to the depending sinusoidal projection on the upper rim on the opposite side of the upstanding projection on the lower rim. In this manner the springs will normally all be arranged in horizontal planes, but slightly under tension, because the points of attachment will be diametrically opposite each other. However, when pressure is applied to the wheel the tendency of the lower portion of the wheel to place the lower series of springs under tension will be communicated throughout the wheel and all of the springs will be placed under approximately the same amount of tension, so that the resiliency will be distributed circumferentially around the felly. This equal distribution of the tension on the springs is due to the fact that the outer rim is provided with fixed securing-points—that is, the securing-points for the springs do not under any condition change, but the securing-points for the springs carried by the inner rims change proportionately to the amount of weight applied to the wheel. When the springs are under abnormal tension, they are alternately inclined in such a manner that each alternate spring is inclined in a direction opposite to the adjacent ones. Hence the provision for resisting the end thrust as well as the provision for the side thrust of the axle is made.

The movement of the inner rim will be limited only by the width of the sinuous slot formed in each side of the housing, and this slot will be wide enough to meet the varying requirements. The lower portion of the outer rim is provided with an annular filler 14, around which are bent the side walls of the lower rim, which side walls are provided with flared outer edges 15 and 16 to receive the resilient tread 17, preferably of rubber.

In order to protect the springs from deterioration due to atmospheric conditions, as well as the introduction of dust, dirt, and other foreign substances, I employ protector-plates 18 and 19, which overlap the side walls of the inner and outer rims, which side walls are secured in place by means of rivet-rods 20, which extend through the filler 14, the side walls 18 and 19, and the side walls of the outer rim-section.

In assembling the parts the heads carried by the respective springs will be introduced into the sockets, and the sides 18 and 19 may then be placed in proper position, as illustrated in Fig. 2. While I prefer to employ the side plates 18 and 19, I appreciate that under certain conditions these side plates may not be essential, and I therefore desire to have it understood that I do not limit myself to their use, but reserve the right to make the tire with or without these.

By providing a tire constructed in accordance with my invention I combine the advantages of a pneumatic tire with those of a spring-tire in that I obtain the resiliency of a spring-tire together with the noiseless feature of the pneumatic tire.

Having thus described the invention, what is claimed as new, and desired to be secured by Letters Patent, is—

1. A wheel-tire comprising two rims having alining walls, the edges of which are in the form of sinusoidal curves, the projections formed by said curves alternating with each other, and transversely-arranged tension-springs connected to the transversely-opposite projections; substantially as described.

2. A wheel-tire comprising two rims spaced apart, the adjacent edges of the rims forming a sinuous slot, coil-springs connecting the projections on one rim with those on the other, and protector-plates carried by one of the rims and overlapping the other to close the slot; substantially as described.

3. A wheel-tire comprising two rims spaced apart, the adjacent edges of the rims forming a sinuous slot, coil-springs connecting the projections on one rim with those on the other, protector-plates carried by one of the rims and overlapping the other to close the slot, and a resilient tread carried by the outer rim; substantially as described.

4. A wheel-tire comprising two rims each of which is provided with two parallel walls, and each of which is provided with outstanding projections arranged in transverse alternating series, each projection on one of the rims transversely alining with those on the opposite side of the other rim, and coil-springs connecting the transversely-alining projections; substantially as described.

5. A wheel-tire comprising two rims one within the other and both of said rims having vertical walls alining with each other, springs arranged within the rims and having their opposite ends connected to the vertical walls of the inner and outer rims respectively so that all of the springs will be in tension under load; substantially as described.

6. A wheel-tire consisting of inner and outer rim portions the walls of which aline with each other, said inner and outer rim portions having diametrically opposite overlapping projections on their respective sides, and horizontally-arranged coil-springs connected to the oppositely-arranged overlapping projections and normally under tension; substantially as described.

7. A wheel-tire comprising spaced rims whose walls aline with each other, and a series of coil-springs connecting said rims, which springs are alternately oppositely inclined under abnormal tension; substantially as described.

8. A wheel having a tire comprising two sections, one of which is the inner section and approximately U-shaped in cross-section with side flanges disposed outwardly, the other section being the outer section and having side flanges which aline with those on the inner section, the flanges on the side walls of one section having projections which aline with those on the opposite section, the projections on the inner rim overlapping those on the outer rim, and said projections on each side of the inner rim transversely alining with the projections on the opposite side of the outer rim, and a spring connecting each projection on the outer rim with the transversely-alining projection on the inner rim; substantially as described.

9. A wheel-tire comprising an inner rim and an outer rim, the outer rim having side walls which aline with the side walls of the inner rim, said outer and inner rims being spaced apart, and transversely-arranged springs confined within the rim, one end of each spring being connected to the inner rim, while the other end is connected to the outer rim; substantially as described.

In testimony whereof I hereunto affix my signature, in the presence of two witnesses, this 24th day of May, 1905.

BENJAMIN C. SEATON.

Witnesses:
 B. F. FUNK,
 GEORGE BAKEWELL.